March 27, 1951

L. A. BLACKBURN 2,546,211

LUBRICATOR

Filed Dec. 30, 1946

INVENTOR.
LUTHER A. BLACKBURN
BY
*Westall & Westall*
ATTORNEYS

Patented Mar. 27, 1951

2,546,211

UNITED STATES PATENT OFFICE 2,546,211

LUBRICATOR

Luther A. Blackburn, Lynwood, Calif.

Application December 30, 1946, Serial No. 719,256

4 Claims. (Cl. 184—15)

This invention relates to lubricators, and contemplates more specifically apparatus for continuously supplying oil in small uniformly measured quantities to a series of laterally spaced points of friction in chain assemblies and other mechanism.

Endless chains commonly employed for the transmission of power in heavy machinery often involve hundreds of individually moving parts which require continuous lubrication to prevent structural failure. In order to assure the effective lubrication of roller chains during operation, a film of oil or grease must be maintained upon the rollers between pairs of which the teeth of the sprockets engage, and also between the overlying and contiguous portions of each adjoining pair of links and the ends of the pins by which the links are connected. In the art prior to my invention it is common practice to place oil-saturated brushes or pads in contact with the chain to transmit oil to the latter continuously. In such a system, oil is only deposited on those surfaces which actually rub upon the brush or pad, and unless an excessive amount of oil is employed the surfaces of the chain elements where most friction occurs are relatively unprotected. The continued uniform application of lubricant by such means is impossible, due to progressive wear of the brushes or pads.

It is a principal object of the present invention to provide a lubricator embodying mechanism for depositing a succession of drops of oil at each of a plurality of laterally-spaced points on a chain or other apparatus, the quantity of the oil deposited and the frequency of the deposition being critically regulated in accordance with a predetermined estimate of specific requirements.

More specifically, an object hereof is the provision of an oil reservoir equipped with means for supporting the same transversely across the mechanism to be lubricated, in combination with associated distributing elements, each adapted to receive from the reservoir a continuous flow of oil and operable to dispense the oil in drops, the interval between the gravitation of successive drops and the volume of oil in each drop being fixed to assure uniformity in the operation of each distributing element while permitting a greater or lesser flow of oil through the other distributing elements.

Still another object is to provide a tubular oil reservoir horizontally disposed and having a plurality of lateral ports arranged along the length thereof for the flow of oil from the reservoir in volume determined by the level of the oil within the reservoir relative to the height of the respective ports therein.

Numerous other objects and corresponding advantages, such for example as simplicity of construction, ease of assembly, adaptability to numerous utilities, facility in cleaning, and susceptibility to modification so as to produce a different flow of oil from different distributing elements, will be apparent to those of skill in the art upon an examination of the following description read in the light of the accompanying drawings, in which.

Figure 1:
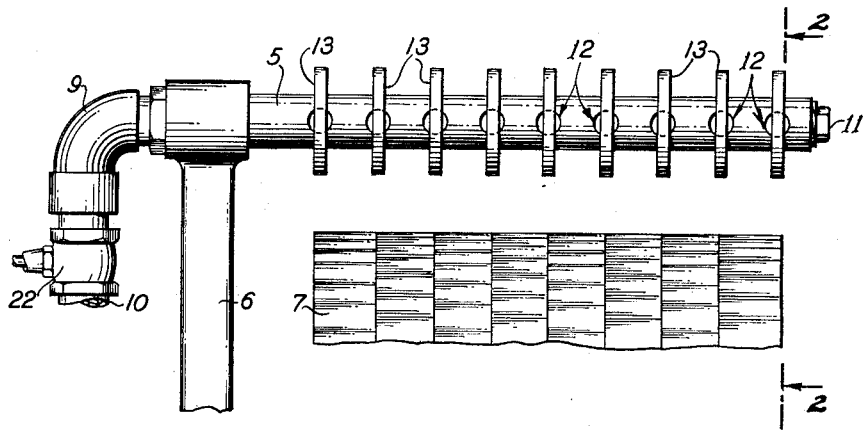
Fig. 1 is a fragmentary elevation of one embodiment of my invention, arranged for the lubrication of a silent chain.

Referring to the drawings in detail, the numerals of which indicate similar parts throughout the several views, 5 designates a tubular reservoir supported in a horizontal position by bracket 6 transversely across the upper end of a vertically-arranged silent chain 7 to be lubricated, where the chain passes over a sprocket 8. One end of tube 5 is connected by an elbow 9 to a pipe 10 through which oil under predetermined pressure, as hereinafter more fully described, is pumped from a source of supply (not shown) to the reservoir. The opposite end of tube 5 is fitted with a removable plug 11 to facilitate cleaning of the inside of the tube when necessary.

It will be understood that the invention is adapted for the simultaneous lubrication of a number of laterally-spaced points of friction in one or a plurality of mechanisms of which the silent chain 7 is merely illustrative. In the application of Fig. 1 tube 5 is of a length to extend across and above the entire width of the chain, an object being to deposit drops of oil at regular intervals at equally and laterally-spaced friction points between the links of the chain. To this end, a series of orifices 12 are formed in the side of tube 5, the lower arc of each orifice 12 being above the bottom of the tube. Inasmuch as, in the embodiment illustrated, all of the points of friction to be lubricated in the chain are to receive a total equal volume of oil per unit of time of operation, the orifices 12 are of the same diameter and are all located at the same level. Encircling tube 5 are a plurality of flat, annular distributing elements 13 which are identical to one another. The elements 13 are of a number equal to the number of orifices 12 and are arranged to encircle the portions of the tube in which the orifices are located, respectively. Each ring element 13 is of a thickness less than the diameter of the orifice over which it extends, so as to blank off the middle vertical segment of said orifice without restricting the sides thereof through which a liquid lubricant may freely flow.

One of the distributing elements 13 is thus disposed over each point of friction to be lubricated. Oil under pressure is conveyed to the tubular reservoir 5 from a source of supply under constant pressure through pipe 10 so as to maintain the level of the oil within the tube slightly above the lower edges of the dual openings of each orifice 12, i. e., at each side of the respective ring elements 13 whereby the oil will continuously, but very slowly, flow from the respective orifices.

As each of the ring elements 13 define one side of each opening, the oil flowing slowly from the latter adheres to the ring element and gravitates to the center of the lower, outer arc of the ring where it accumulates momentarily and then drops from the distributing element to the point of friction directly therebelow. In the embodiment illustrated, the lower edge of each ring is square cut, and accordingly affords a rather wide area for the accumulation of the oil, with the result that comparatively large drops of oil will be released from the respective elements. However, it will be obvious that the contour of the lower arc of each or any of the rings may be varied to meet specific requirements, and that in accordance therewith this portion of each ring or any of them may be beveled to any desired degree or otherwise formed to simultaneously produce one or more drops of any required size. It will also be apparent that the ring elements may be tilted slightly to direct the oil laterally from the respective orifices over which they extend whereby the accumulation of the oil on the lower arc of each distributing element occurs laterally of the orifice from which the oil emanates.

The interval between drops may be varied by increasing or decreasing the flow of oil into the reservoir 5 from the supply pipe 10 by adjustment of a valve 22. If my invention is employed to dispense a very heavy grade of oil and a rapid uniform flow of oil is required, it will be appreciated that unless compensation is made for the viscosity of the oil, a greater flow will occur through the orifices 13 nearest adjacent the source of supply. This result will be obviated by the successive slight enlargement of the orifices toward the outer end of the tube or the disposition of the orifices at successively lower points from the direction from which the oil is supplied toward its opposite end. Variation in the relative size of the orifices may also be resorted to as a means of obtaining a different flow of lubricant from different orifices, the viscosity of the oil being taken into consideration.

Figure 3:
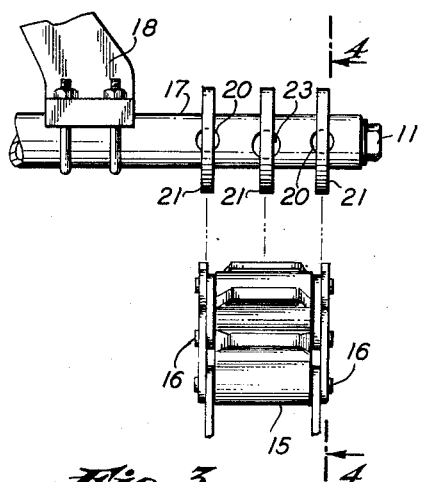
Fig. 3 is an elevation of another embodiment of my invention as employed for the lubrication of a roller chain.
Figure 2:
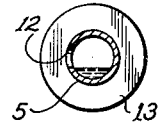
Fig. 2 is a transverse sectional view through the tubular reservoir of the apparatus depicting in dotted lines the direction of the flow of oil from the reservoir, across one of the distributing elements, to a chain and sprocket shown in broken elevation.
Figure 4:
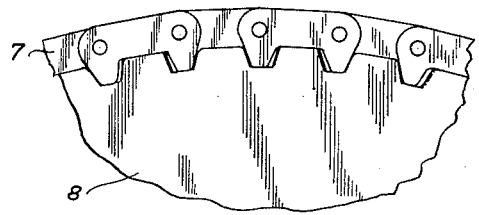
Fig. 4 is a transverse sectional view similar to Fig. 2 taken on lines 4—4 of Fig. 3.
Figure 4:
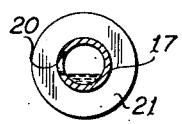
Figure 4:
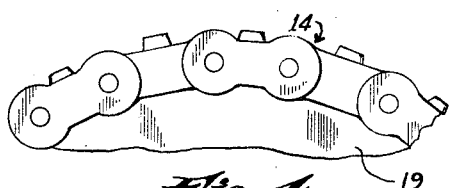

In the embodiment of my invention shown in Figs. 3 and 4, a vertical endless roller chain 14 is illustrated. In such chains the rollers 15, as well as the link pins 16, must be continuously lubricated if the life of the chain is to be extended. Accordingly, a short tube 17 supplied with oil through a pipe (not shown) is supported by a bracket 18 above the upper end of the chain structure where it passes over the sprocket 19. The tube 17 is formed with three circular orifices, the outer two of which, identified by numeral 20, are disposed directly above the line of movement of the opposite ends of the link pins 16, respectively, while the middle orifice is located in a plane passing through the centers of the rollers 15. Three rings 21 encircle the portions of tube 17 in which the orifices 20 are located so as to provide guides for the flow of the oil slowly expelled from the respective orifices.

In this form of my invention the middle orifice 23 is disposed slightly below the level of the outer orifices 20 and is slightly larger. Thus a greater flow of oil will occur through the middle orifice 23 than if the orifices were horizontally aligned. Depending upon the viscosity of the oil, the flow through the first and second orifices 20 and 23 may be identical and considerably greater than the flow through the third orifice 20.

The operation of the assembly of Figs. 3 and 4 is substantially as above described, the oil gravitating over the rings 21 forming drops at the center of the lower arc of each ring. The two end rings assure the direction of the drops released onto the links at opposite sides of the chain and the ends of the link pins 16, and, in a like manner, the gravitation of oil drops from the center ring 21 correspondingly controlled to effect the uniform continuous lubrication of the rollers 15.

It will be appreciated that the upper portion of each of the distributing elements 13 and 21, in the respective embodiments, perform directly no function insofar as the flow of oil from the respective orifices is concerned, but merely supports the lower arc of the ring in a position to receive the oil as it flows from the orifice. This structure, enabling the utility of conventional washers for the distributing elements, contributes in important respects to the feature of the invention residing in the simplicity and economy of construction and ease of assembly.

While I have shown but two embodiments of my invention, numerous changes may be made in size, design, shape and number of the various parts, as will be obvious to those of skill in the art, particularly in the length of the tubular reservoir, the number and spacing of the orifices for the flow of oil, and the contour of the respective distributing elements associated with the orifices, and further it will be apparent that the specific pump and control mechanism (not shown) for maintaining the required level of oil in the reservoir may involve means for periodically increasing the flow or may be synchronized with the speed of, or made variable in accordance with, the load carried by the chains or other mechanism to be lubricated, all without departing from the spirit of my invention as defined in the appended claims.

What I claim and desire to secure by Letters Patent is:

1. In a lubricator adapted for communication with a source of liquid lubricant under pressure, a conduit having a plurality of lateral discharge orifices therein, means closing one end of said conduit, means to support said conduit in a substantially horizontal position, and a plurality of washers snugly encircling said conduit and overlying the lateral discharge orifices, respectively.

2. In a lubricator adapted for communication with a source of liquid lubricant under pressure, a conduit having a plurality of lateral discharge orifices therein, means closing one end of said conduit, means to support said conduit in a substantially horizontal position, and a plurality of washers snugly encircling said conduit and overlying the lateral discharge orifices, respectively, the lower edge of each of said orifices being contiguous with an edge of an adjacent washer.

3. In a lubricator adapted for communication with a source of liquid lubricant under pressure, a tubular conduit having a plurality of lateral discharge orifices therein, means closing one end of said conduit, means to support said conduit in a substantially horizontal position, and a plurality of arcuate guides connected to said conduit extending from the lower edge of said orifices, respectively, to below said conduit, whereby lubricant supplied to said conduit under pressure is expelled from each of said orifices for gravitation therefrom over said guides and is accumulated by the latter for release in the form of drops.

4. In a lubricator adapted for communication with a source of liquid lubricant under pressure, a tubular conduit having a plurality of lateral discharge orifices therein, means closing one end of said conduit, means to support said conduit in a substantially horizontal position, and a plurality of arcuate guides connected to said conduit extending from the lower edge of said orifices, respectively, to below said conduit, whereby lubricant supplied to said conduit under pressure is expelled from each of said orifices for gravitation therefrom over said guides and is accumulated by the latter for release in the form of drops, the lower edge of one of said orifices being lower than the lower edge of another of said orifices to produce a lesser flow of lubricant from the latter orifice.

LUTHER A. BLACKBURN.

REFERENCES CITED

The following references are of record in the file of this patent:

UNITED STATES PATENTS

| Number | Name | Date |
|---|---|---|
| 790,461 | Skinner | May 23, 1905 |
| 1,428,177 | Mead | Sept. 5, 1922 |
| 1,438,163 | Montgomery | Dec. 5, 1922 |
| 1,601,780 | Tripp | Oct. 5, 1926 |
| 1,930,368 | Nelson | Oct. 10, 1933 |
| 1,938,042 | Robinson | Dec. 5, 1933 |
| 1,938,506 | Wellman | Dec. 5, 1933 |
| 2,030,646 | Longo | Feb. 11, 1936 |